Sept. 26, 1933.   S. H. TURRELL   1,928,578
AIRCRAFT
Original Filed Sept. 1, 1931   3 Sheets-Sheet 3

Inventor
Stanley H. Turrell,

By Clarence A. O'Brien
Attorney

Patented Sept. 26, 1933

1,928,578

UNITED STATES PATENT OFFICE 1,928,578

AIRCRAFT

Stanley H. Turrell, Glendale, Calif.

Application September 1, 1931, Serial No. 560,590
Renewed March 20, 1933

1 Claim. (Cl. 244—18)

The present invention relates to aircraft and particularly to the heavier than air type and has for its prime object to provide means whereby the aircraft may ascend and descend vertically or practically so.

A further important object of the invention resides in the provision of aircraft of this nature which possesses a comparatively simple structure which is easy to manipulate and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

Figure 1:
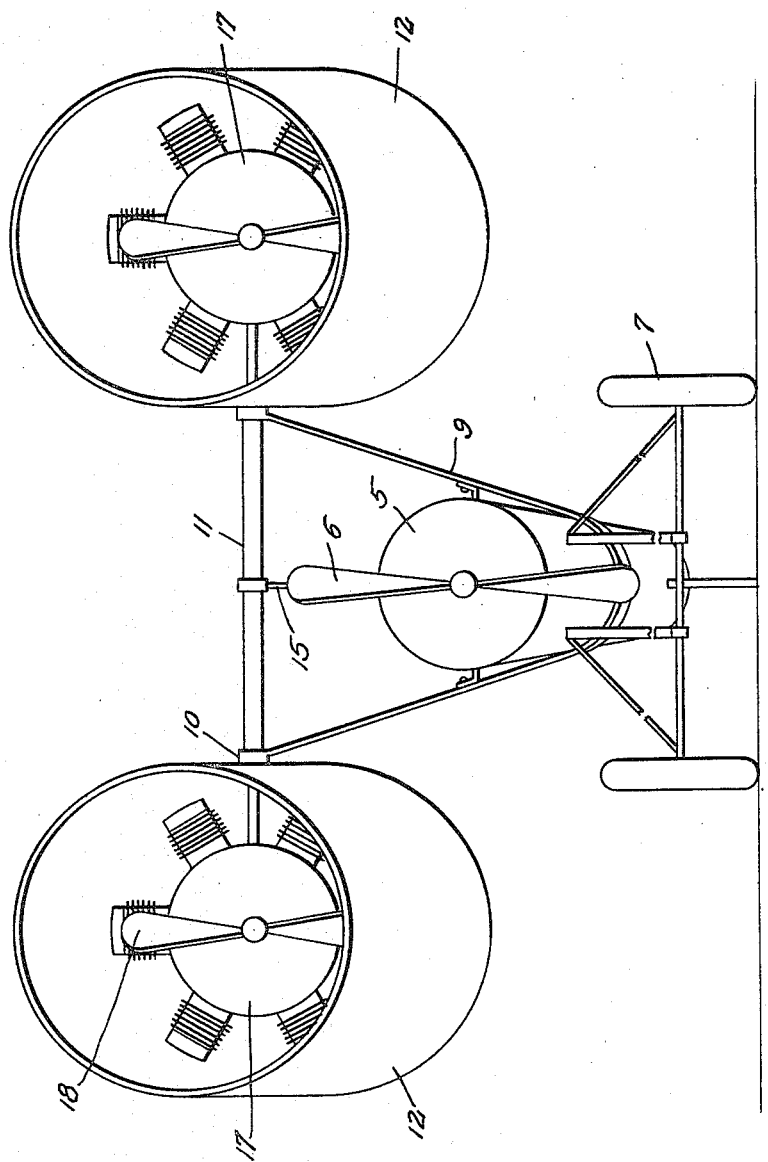
Figure 1 is a front elevation of an aircraft embodying the features of my invention.
Figure 2:
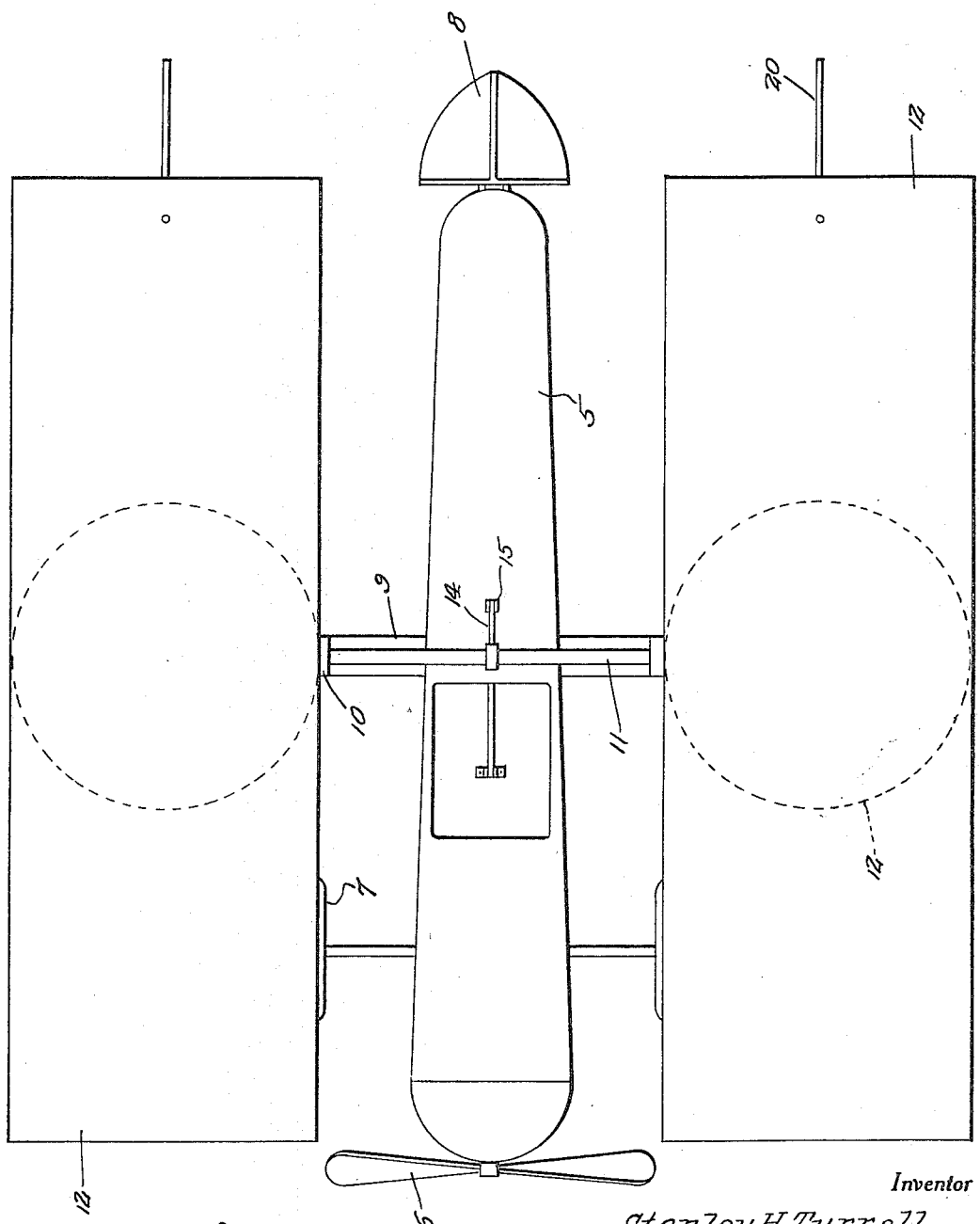
Figure 2 is a top plan view thereof.

Referring to the drawings in detail, it will be seen that numeral 5 denotes a fuselage with a propeller 6 at the front end thereof and a landing gear 7 therebelow. The usual elevator and rudder structure 8 is provided at the rear of the fuselage. Numeral 9 denotes a cradle extending from under an intermediate portion of the fuselage to points thereabove terminating in bearings 10 in which is journalled a shaft 11 on the ends of which are elongated tubes 12. The shaft 11 is rockable by a crank 14 remotely controlled through linkage 15 operable from inside the fuselage at the cockpit. In each tube there is a motor 17 for driving a propeller 18. In the end of each tube at the rear thereof is a fin 20 projecting rearwardly out of the tube.

Figure 3:
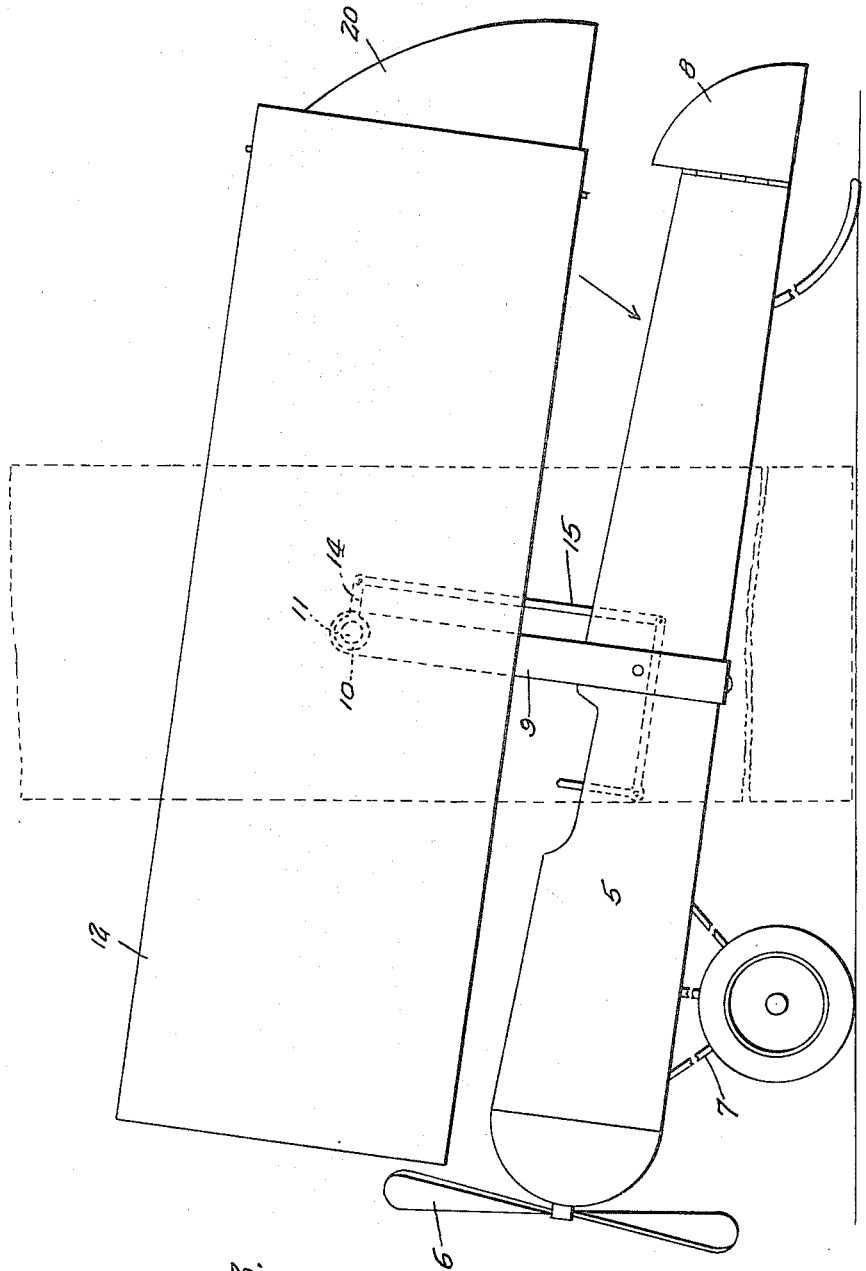
Figure 3 is a side elevation thereof.

From the above detailed description, it will be seen that if it is desired to rise vertically or approximately so, the tubes are adjusted to a vertical position as is indicated in dotted lines in Figure 3 so that the aircraft may be lifted off the ground. When travelling forwardly the tubes are disposed with their axis in substantial parallelism with the axis of the fuselage. In descending the tubes are again adjusted to vertical position and the propellers 18 caused to rotate at a speed which will allow the air craft to slowly descend to the ground.

In ordinary flying, the tubes when adjusted to the position shown in full lines in Figure 3 will function as ordinary lifting plane.

It is thought that the construction, operation, utility and advantages of this invention will now be quite apparent to those skilled in this art without a more detailed description thereof.

The present embodiment of the invention has been disclosed merely for the purposes of exemplification and it is to be understood that changes in the details of construction, and in the combination and arrangement of parts may be resorted to without departing from the spirit or scope of the invention as hereinafter claimed or sacrificing any of its advantages.

Having thus described my invention, what I claim as new is:

An aircraft having a propeller at its front end, rudder means at its rear end and landing gear, a cradle of substantially U-shape having its lower part passing around sides and bottom of the fuselage with its limbs extending well above the fuselage, said limbs diverging upwardly and having bearings at their upper ends, a shaft extending across the cradle and journalled in said bearings, an elongated tube connected to each end of the shaft at substantially the central part of the inner side of the tube whereby said tubes will move with the shaft, a motor driven propeller in each tube, a rudder in the rear end of each tube and projecting therefrom, an arm on the central part of the shaft, a lever in the cockpit, means for connecting the lever to the arm for imparting a rocking movement to the shaft.

STANLEY H. TURRELL.